July 27, 1965  J. I. NEVO-HACOHEN  3,197,045
CONVEYOR ELEVATOR APPARATUS
Filed Sept. 12, 1962  6 Sheets-Sheet 1

INVENTOR.
JACOB I. NEVO-HACOHEN
BY Rines and Rines
ATTORNEYS

July 27, 1965  J. I. NEVO-HACOHEN  3,197,045
CONVEYOR ELEVATOR APPARATUS
Filed Sept. 12, 1962  6 Sheets-Sheet 2

INVENTOR.
JACOB I. NEVO-HACOHEN
BY Rines and Rines
ATTORNEYS

July 27, 1965   J. I. NEVO-HACOHEN   3,197,045
CONVEYOR ELEVATOR APPARATUS

Filed Sept. 12, 1962   6 Sheets-Sheet 3

INVENTOR.
JACOB I. NEVO-HACOHEN
BY Rines and Rines
ATTORNEYS ered July 27, 1965

3,197,045
CONVEYOR ELEVATOR APPARATUS
Jacob I. Nevo-Hacohen, Boston, Mass., assignor, by direct and mesne assignments, of one-twelfth to Robert H. Rines, Belmont, Mass., three-eighths to Alan S. Axelrod, Newton, Mass., and three-eighths to Theodore J. Shoalman, Boston, Mass.
Filed Sept. 12, 1962, Ser. No. 223,009
10 Claims. (Cl. 214—16.1)

The present invention relates to continuous conveyor elevator apparatus for garaging and the like.

Numerous proposals have been made, and various types of structures have been developed, for alleviating the problem of parking automobiles in confined spaces, such as in large cities and other areas where space is at a premium. Included in such types of apparatus are continuous conveyor elevators that enable a party to drive into a garage and that thereupon provide for the automatic storing of the automobile in a particular location whence it may be subsequently recovered by the conveyor elevator system without the necessity for providing separate parking spaces and the like or utilizing the services of attendants to orient automobiles in parking spaces and remove the same therefrom.

In some of the prior devices, it is necessary to employ large sprockets and other elevator chain-moving mechanisms that are not of standard construction and to employ volumes for the platform region that require much more space than is actually necessary to drive the car onto a platform and then remove the same therefrom. The problem of the suspending and rendering stable of the platforms moved by the elevator chain has received a great deal of attention in numerous proposals, and very complicated and expensive stabilizing constructions have been proposed. In some instances, a large number of chains are required, as well as special suspending and stabilizing systems; though in others, a pair of chains may be employed with supplementary stabilizing mechanism that inherently requires the over-all dimensions of the facility to be far greater than is actually necessary for storing the automobiles themselves. In addition, some of the prior-art proposals do not lend themselves to the doubling, tripling or further multiplying of the units of storing facilities, but require different sizes and arrangements of storing elevator systems in the event that more than one is to be employed in an installation.

An object of the present invention is to provide a new and improved continuous conveyor elevator system that shall not be subject to any of the above-described disadvantages but that, to the contrary, enables the utilization of but a single pair of driven endless main chains and enables a minimum volume construction to be achieved, consistent with attaining both horizontal and vertical stability of storing elevator platforms.

Another object of the present invention is to provide a new and improved conveyor elevator of the character described that is modular in nature so that multiple units may be readily constructed, with each unit being identical and requiring exactly the same size and components.

A further object of the invention is to provide a novel conveyor elevator system in which a simplified horizontal stabilizing system is provided that allows optimum use of storage volume.

Other and further objects will be explained hereinafter and will be more particularly pointed out in connection with the appended claims. In summary, however, the invention contemplates a conveyor elevator apparatus having, in combination, a pair of similar closed-loop main channels disposed in a pair of spaced substantially parallel planes and a further pair of similar closed-loop auxiliary channels disposed in a pair of substantially parallel planes one adjacently displaced from each of the main channels in the space therebetween. A pair of synchronously driven main chains, for example, of the apparatus is disposed to travel within the pair of main channels and a pair of follower means is disposed to travel in the pair of auxiliary channels. A carrier platform having a substantially horizontally oriented carrying surface and bounded by lateral sides is disposed between the auxiliary channels. The carrier platform is secured to the main chains and the follower means by a first shaft means connected with the said lateral sides and journaled to the main chains, and a second shaft means connected with the said lateral sides at regions displaced from the connections to the first shaft means and journaled to the pair of follower means. Auxiliary conveyor means, shown preferably as a pair of auxiliary chains is provided to travel in each of the auxiliary channels and to engage the pair of follower means at, for example, the end locations of the main chain loops where the chain conveyors change direction and to drive the same across the ends of the loops of the auxiliary channels while maintaining the carrier platform surfaces substantially horizontal.

The invention will now be described in connection with the accompanying drawing, FIG. 1 of which is a schematic diagram of an elevation section view of a garage embodying the present invention showing substantially one-half of a conveyor elevator apparatus, the other half being a mirror image of that shown;

Figure 1:
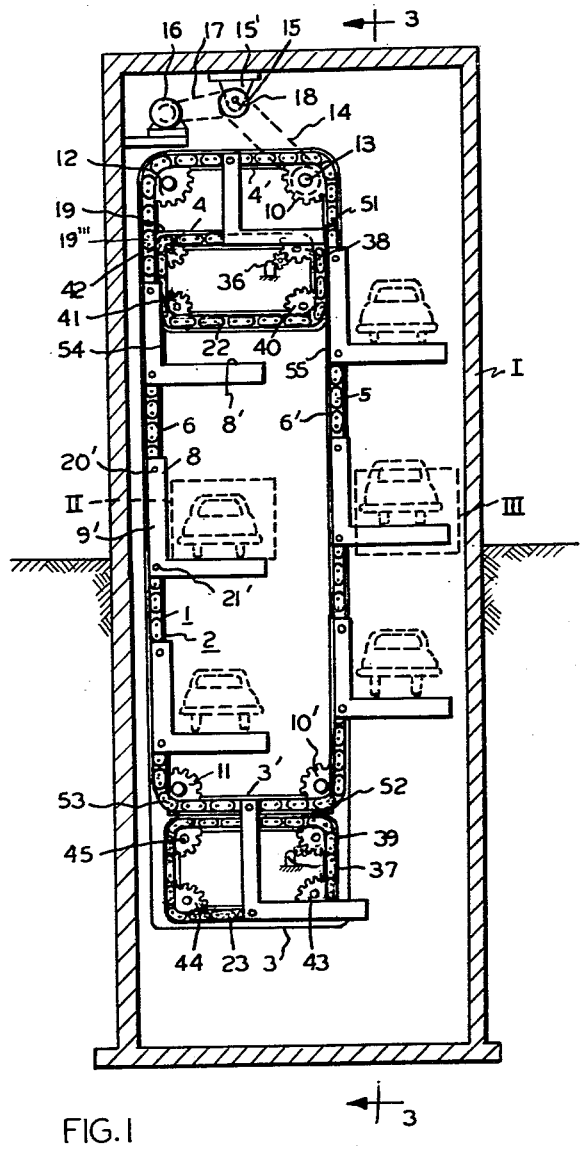
Figure 3A:
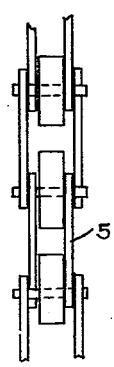
FIG. 3A is a detail view of a small segment of a proposed main chain.
Figure 3:
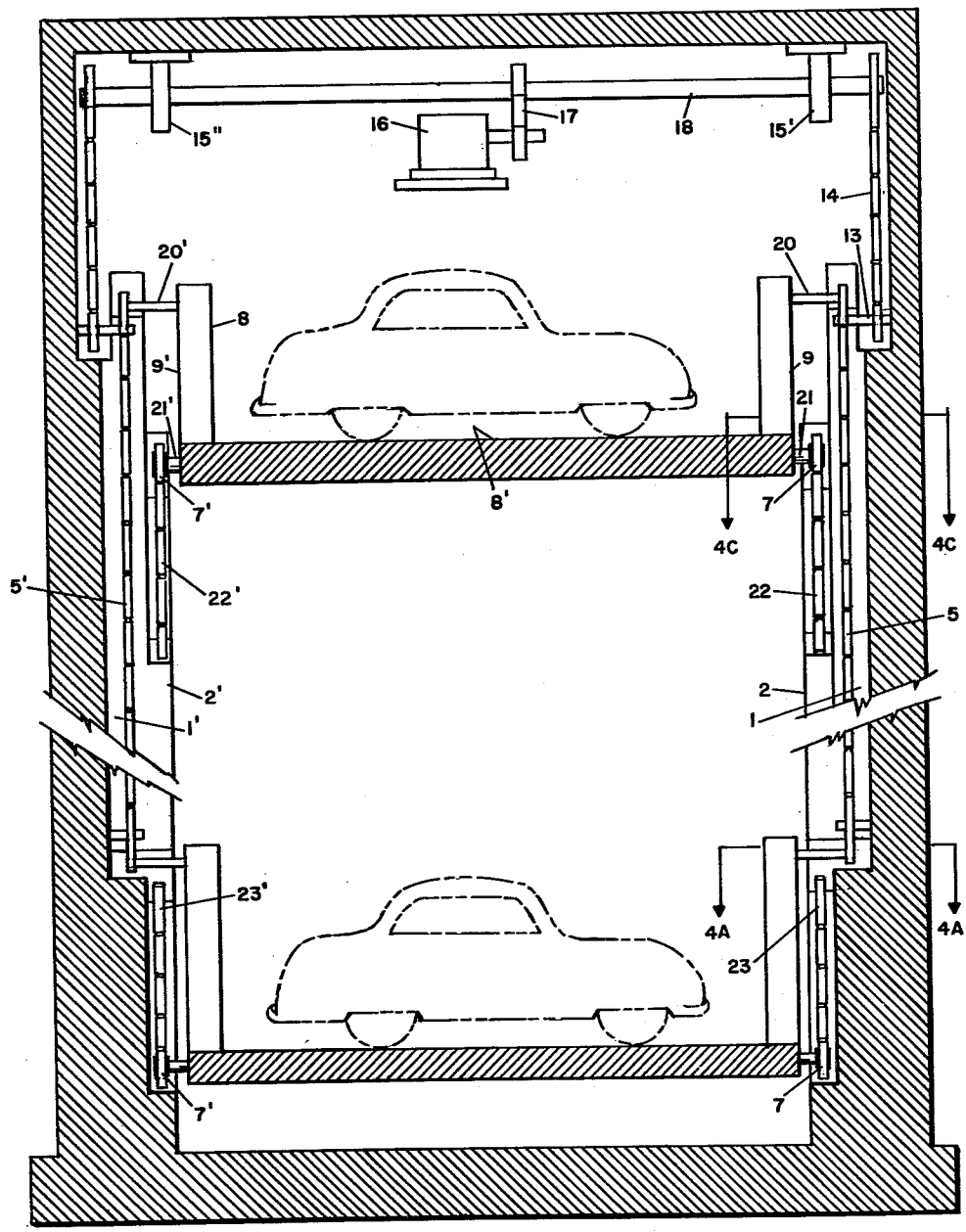
FIG. 3 is a schematic section view taken upon the line 3—3 in FIG. 1 and shows in detail, on an enlarged scale, the said driving mechanism for movement of the conveyed automobiles.

Referring to FIGS. 1 and 3, a plurality of automobiles is shown, in phantom, stored in a conveyor-elevator apparatus of the present invention. The automobiles may be driven onto a plurality of carrier platforms 8 of the apparatus through an entrance II of a building I, and, in a manner to be explained more fully hereinafter, each may be moved to various of the storing positions shown, and removed through an exit III.

The conveyor elevator apparatus has a pair of similar closed-loop main channels 1 and 1', FIG. 3, disposed in a pair of spaced substantially parallel planes. (Only one such channel 1 is shown in FIG. 1, the other channel being a mirror image of the same.) A further pair of similar closed-loop auxiliary channels 2 and 2' is disposed in a pair of substantially parallel planes adjacently displaced respectively from each of the main channels 1 and 1' in the space therebetween. A pair of synchronously driven main chain conveyors 5 and 5' is disposed to travel within the pair of main channels 1 and 1', respectively. A pair of followers or follower means 7 and 7' travels in the pair of auxiliary channels 2 and 2', respectively, in a manner later discussed.

A plurality of the carrier platforms 8, each provided with a carrying surface 8' and bounded by lateral sides 9 and 9', is illustrated as disposed between the auxiliary channels 2 and 2'. First shafts or shaft means 20 and 20' are connected at one end thereof to the carrier platform 8 at the lateral sides 9 and 9', respectively, and are journaled at the other end thereof to the chains 5 and 5', respectively. Second shafts or shaft means 21 and 21' are also connected with the lateral sides 9 and 9', respectively, at regions displaced from the connections of the first shafts 20 and 20', and are journaled, respectively, to the followers 7 and 7'.

Thus, upon driving of the main chains 5 and 5', as hereinafter set forth, movement of the carrier platforms 8 is effected in a path determined by the shape of the loops of the similar main channels 1 and 1' (and, also, of course, by the shape of the auxiliary channels, which are similar to the main channels).

A pair of auxiliary chain conveyors 22 and 23, of effective length substantially less than that of the main conveyors 5, 5', is shown disposed to travel respectively in the upper and lower direction-changing ends of the loops of auxiliary channel 2, and similar auxiliary chains 22' and 23' are shown disposed to travel respectively in the upper and lower direction-changing ends of the loops of the auxiliary channel 2' to engage, only at the respective direction-changing end locations, the followers 7 and 7', respectively, and to drive the same across the said ends of the loops, shown at 3 and 4 in FIG. 1 for the auxiliary channel 2 with the carrier platform surfaces 8' maintained in substantially the same horizontal orientation throughout their travel.

The overall operation of the conveyor elevator having been discussed, it is in order to discuss details of the apparatus and this will now be done particularly in connection with the main channel 1 and related elements, as shown, for example, in FIG. 1, the main channel 1 and the auxiliary channel 2 thereof being rectangular in shape. It should be kept in mind, however, that any discussion relative to the elements in FIG. 1 and subsequent figures, applies also to the main channel 1' and related elements.

Figures 4A, 4C:
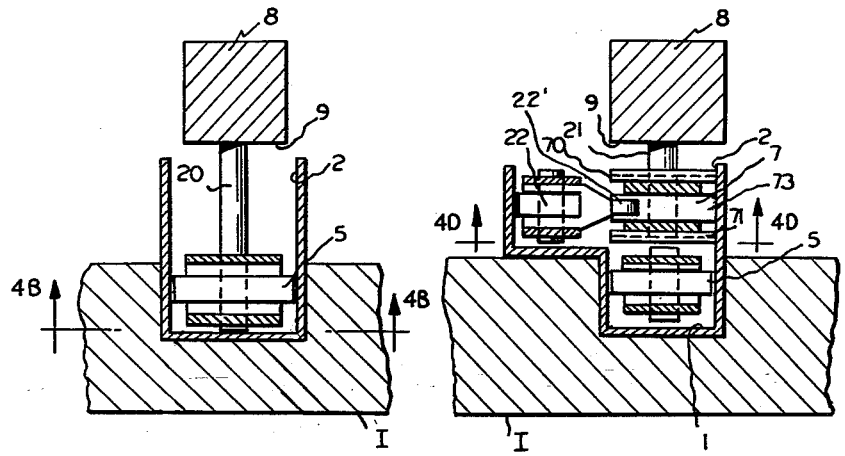
FIG. 4A is a section view taken upon the line 4A—4A in FIG. 3, showing in detail a portion of the main chain within a channel.
FIG. 4C is a detail section view on an enlarged scale taken upon the line 4C—4C in FIG. 3, showing the main chain, an auxiliary chain and a follower.

The main closed-loop channel 1 is shown having longitudinal sides 6, 6' and lateral sides or ends 3' and 4'. The auxiliary closed-loop channel 2 is shown in FIGS. 3, 4A and 4C adjacently displaced from the main channel 1 and having longitudinal sides 54, 55 and, as before mentioned, lateral sides or ends 3 and 4, the longitudinal sides 54 and 55 being alined with and parallel to the corresponding longitudinal sides 6 and 6', respectively, of the main channel 1. The lateral sides 4 and 3 of the auxiliary channel 2 are substantially parallel to the lateral sides 4' and 3', respectively, of the main channel 1 and vertically displaced therefrom. As shown in FIGS. 4A and 4C, the channels 1 and 2, in a part of the longitudinal sides of each, may coincide; the auxiliary channel 2 being merely an inward extension of the main channel 1. The auxiliary channel is enlarged in cross-dimension at the ends of the loops, as shown in FIG. 4C, to provide space for the follower and the auxiliary chain therein.

Figure 2:
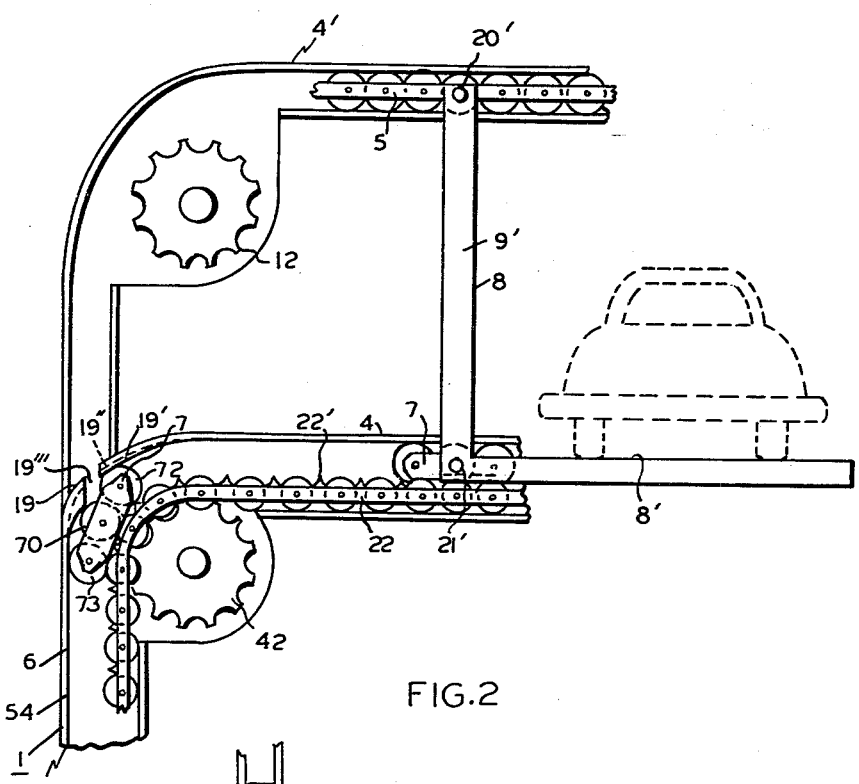
FIG. 2 is a detail view on an enlarged scale showing a portion of the driving mechanism of the apparatus of FIG. 1 whereby a change in the direction of movement of conveyed automobiles is accomplished.
Figures 4B, 4D, 4E:
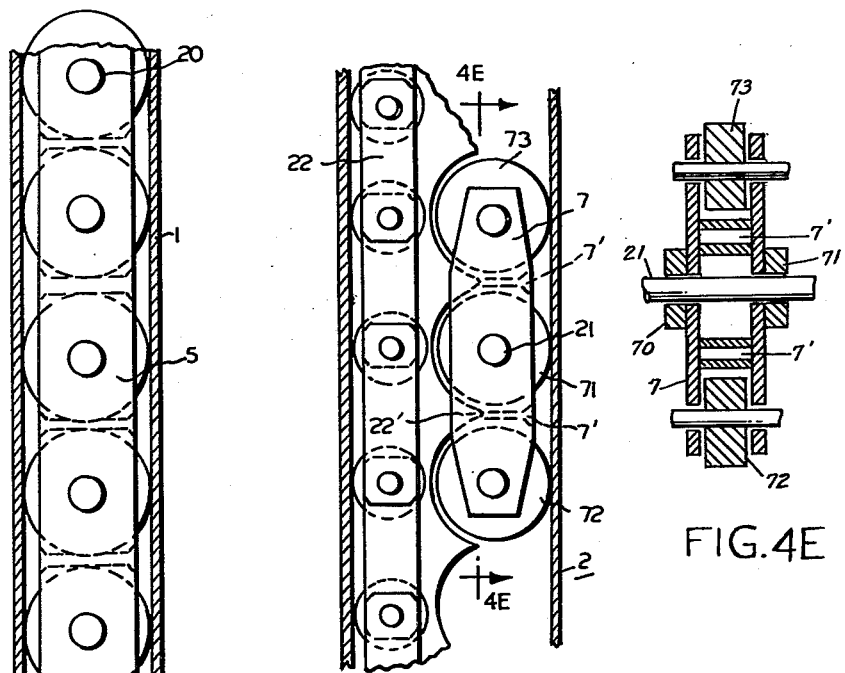
FIG. 4B is a section view taken upon the line 4B—4B in FIG. 4A.
FIG. 4D is a section view on an enlarged scale taken upon the line 4D—4D in FIG. 4C, showing details of the auxiliary chain and follower.
FIG. 4E is a section view of a follower on a reduced scale, taken upon the line 4E—4E in FIG. 4D.

The endless main chain 5, which is preferably a roller chain, as later explained, is disposed to travel longitudinally at 6 and 6' in the main channel 1 and laterally at 3' and 4' thereof. (For purposes of the explanation of the drawings, it will be assumed that all of the chains travel in a generally clockwise direction.) The plurality of four-roller followers 7, as shown in FIGS. 2 and 4E, is disposed to travel in the auxiliary channel 2, traveling longitudinally at 54 and 55 in the auxiliary channel and laterally at 3 and 4 thereof. Since the weight of the automobile exerts a downward force upon the carrying surface 8', a resulting turning moment is exerted through the rollers of the main chain 5 at the top of the carrier platform 8 onto the wall of the main channel 1 nearest the automobile and through the rollers of the follower 7 onto the wall of the auxiliary channel 2 away from the automobile, effectively holding the carrier platform from any wobbling action whatsoever in vertical movement. The vertical component of the weight of the automobile and carrier platform will be carried by the main chain in vertical travel. In lateral movement of the carrier platform 8, the main chain 5 and the follower 7 coact to maintain the carrying surface 8' horizontal, as the reaction due to the turning moment is carried by the chains. The follower 7 is engaged by either of the pair of auxiliary chains 22 or 23 (which are also preferably roller chains), as the case may be, in a manner to be explained more fully hereinafter. The weight of the automobile and carrier platforms in lateral travel is supported through the roller of the main chain 5, at the top, and through the follower to the auxiliary chain rollers, at the bottom, to the lower walls of the respective channels. In operation, therefore, automobiles may thus be stored in a convenient manner and may be made readily available for removal through the exit III by circulating the main chain 5.

The carrier platforms 8 are in spaced relationship along the main chain 5 which serves to maintain a minimal distance therebetween. This chain, in FIG. 1, illustrated schematically as a link chain, may also preferably assume the form of a roller chain, FIG. 2, since rollers, in the lateral channels 3' and 4', as before-explained, support the carrier platforms 8 and allow them relatively frictionless lateral movement. The main chain 5 may be driven, for example, by a sprocket 10 which, in turn, may be driven by an electric motor 16. The motor 16, through a chain 17, drives a sprocket 15 secured to a shaft 18. The shaft 18 engages a further chain 14, through a conventional sprocket (not shown), and the chain 14 drives a further shaft 13 secured to the sprocket 10. Direction changes of the first main chain 5, as from vertical to horizontal travel and vice-versa, occur at idler sprockets 10', 11 and 12. The main chain 1' is similarly driven from the shaft 18 which is journaled at 15' and 15" to a pair of supporting brackets.

Through this simplified construction, a structure utilizing, for example, conventional chain conveyors and similar parts is provided which maximizes the use of space in a storage area or garage at the top or the bottom or any intermediate regions. The effect of the auxiliary chains is to enable a minimal volume to be employed where, for example, the carrier platforms 8, carried by opposite vertical legs of the main chains, need just miss each other by a matter of a few inches; and the height along the vertical distance separating the units may also be minimal since no overhead structure associated with the carrier platform is in any way required.

Since the auxiliary chains are used for the purpose merely of engaging the followers only in the vicinity of the ends of the loops, as before mentioned, for effecting lateral movement of the carrier platforms and are not weight-bearing elements, they need not be constructed any where near as heavy as the main chains. The speed of travel of the auxiliary chains should be related to that of the main chains in order that the bottom member 8' will remain horizontal in lateral travel, but the relative speeds are not critical to the point that they require synchronization since there is no cumulative effect. For this reason, the auxiliary chains, as, for example, 22 and 23, may be driven respectively by gears 38 and 39, which, in turn, may be driven by separate electric gear motors 36 and 37, respectively; or the auxiliary chains may be driven by the electric motor 16 by appropriate gearing; or, in some installations, by appropriate spacing of the carrier platforms 8, the auxiliary chains 22 and 23 may be driven by the main chains 5, the driving force being transmitted through the carrier platform 8 to the follower 7 and thence to the auxiliary chain. Individual drives for the auxiliary chains have the advantage of eliminating long shafting and complicated gearing, in some installations, and, further, the size of the electric motor 16 may be reduced. Idler sprockets 40, 41 and 42 for the auxiliary chain 22, and 43, 44 and 45 for the auxiliary chain 23 permit changes of direction of travel of the respective chains.

It is now in order to describe, in connection particularly with FIG. 2, how a change of direction of travel of the main chain 5 and the follower 7 is accomplished, for example, from longitudinal travel upward at 6 and 54 in the main channel 1 and the auxiliary channel 2, respectively, to lateral travel in the lateral sides 4' and 4, respectively, it being kept in mind that changes of direction of travel at other points are accomplished in a similar manner.

The auxiliary channel 2 is enlarged in cross-dimension at the ends of the loops, as before mentioned, to accommodate the auxiliary chain and the follower 7 therein. The follower 7, as it enters the enlarged portion of the auxiliary channel 2, is engaged at 7', as shown in FIG. 4E, by projections 22', as shown in FIGS. 2 and 4D, of the auxiliary chain 22 and is thereby driven across the ends of the loops of the auxiliary channels. At the point where it curves into the lateral side 4, the curved portion being generally designated 19, the channel 2 has a divided raised track 19' upon which rollers 70 and 71 of the follower 7 will travel and a depressed track 19'' upon which rollers 72 and 73 will travel. A gap or opening means 19''' is provided in the auxiliary channel at 19 to allow the shafts 20 to pass upward. A four-roller follower 7, as shown in FIG. 4E, assures continuous contact between the follower and the channel at 19, thus eliminating a bumping action that would otherwise occur at this point as the follower traverses the gap 19'''. The lateral side 4 is similarly gapped at 51 to allow the shafts 20 to pass downward. Further, the lateral side 3 is similarly gapped at 52 and 53, again to allow the shafts 20 to pass therethrough.

The lateral channels 3, 4, 3' and 4' are shown horizontal in FIG. 1, but they may be inclined at appropriate angles to optimize use of the storage space of the garage. For example, it has been found, for the purposes of the present invention, that the lateral channels may be inclined upward a portion of their length, then made horizontal for a further portion, and then inclined downward for the remainder thereof to attain increased space usage, the platform surfaces 8' being maintained substantially horizontal throughout travel past the direction-changing inclined portions.

It has been mentioned that all of the chains, for purposes of explanation of the present invention, are assumed to travel in a generally clockwise direction. It will be recognized, of course, that the chains may travel equally well in a counter-clockwise direction, and, indeed, this is desired so that the load, in the event of unbalance, may be started with the heavy side traveling downward, thus reducing the starting load on the drive motor and accompanying drive apparatus.

Figure 5:
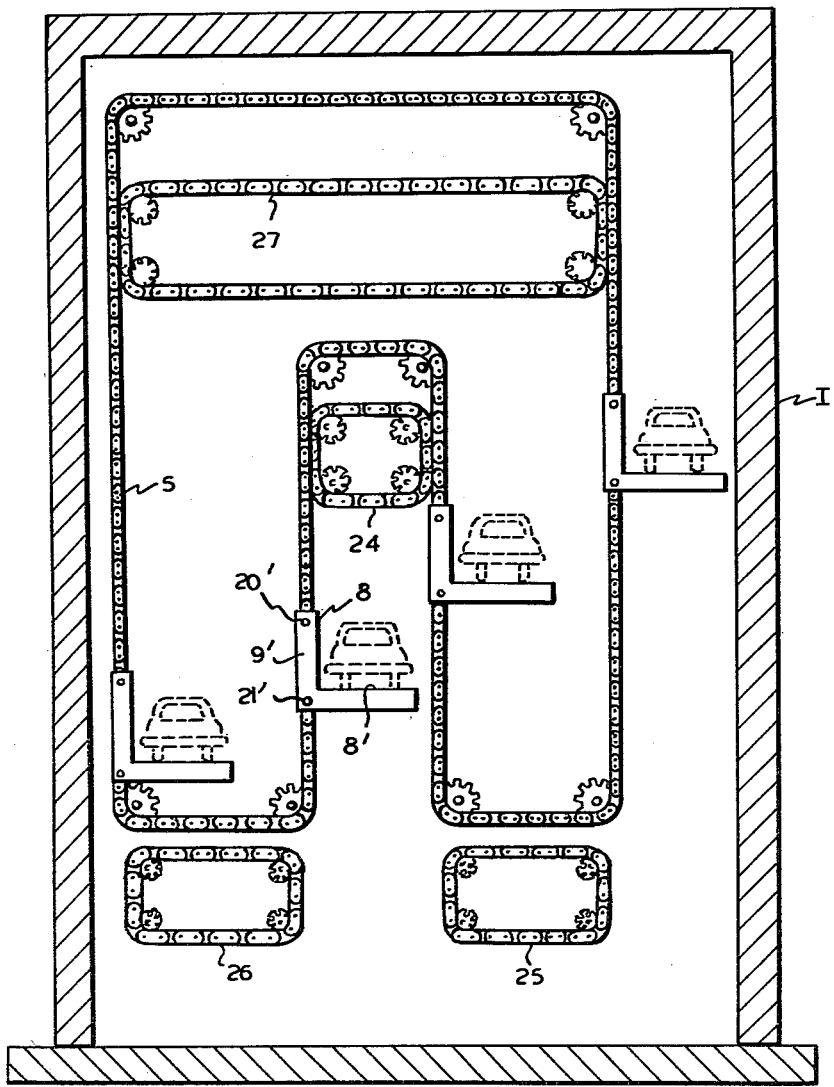
FIG. 5 is a schematic of an elevation section view of a modification of the apparatus shown in FIG. 1.

In the event that a longer multiple chain unit is desired, as shown in FIG. 5, the same type of auxiliary chains as described in connection with FIG. 1 may be employed, as shown at 24, 25 and 26, with the main chain 5 shown modified to provide a U-shaped endless chain and with a further auxiliary chain of the shape shown at 27 disposed below the upper portion of the main chain 5. (The main chain 5' and related elements are not shown in FIG. 5 or in FIG. 6 discussed hereinafter.)

Figure 6:
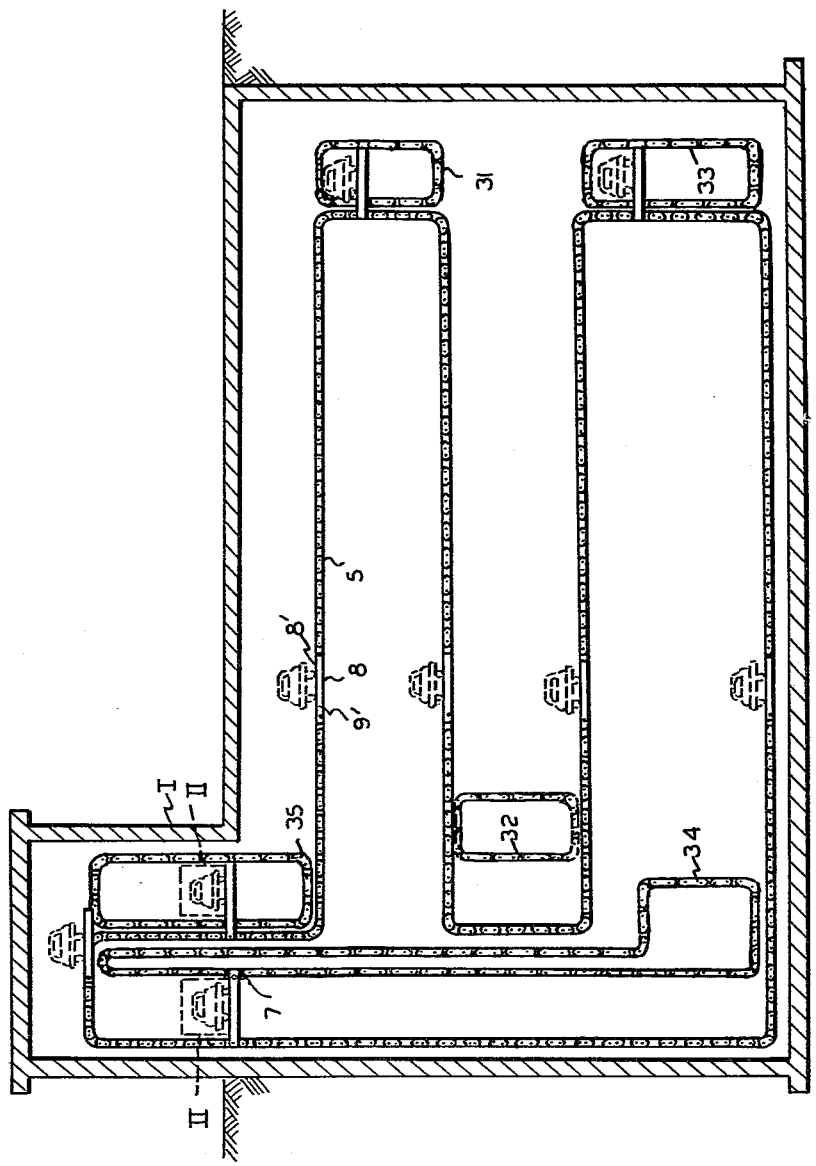
FIG. 6 is a schematic of an elevation section view of a further modification.

The versatility of the apparatus of the present invention is emphasized by the further modification shown in FIG. 6. Here the main chain 5 is shown forming a plurality of horizontally disposed U-shaped paths. The carrier platforms 8 are planar and, at one lateral edge thereof each engages the main chain 5, just as do the carrier platforms 8 of FIG. 1, and, at another point on the same lateral edge each engages a follower 7. The main chain 5 and the followers 7 travel in a channel like the channel 1 before described, but not shown in FIG. 6, and auxiliary channels of the type before described, but also not shown. Vertical lateral movement is effected, in the manner previously described, by coaction of the main chain 5 and a series of auxiliary chains 31, 32, 33, 34 and 35 except that, since there is no turning moment on the carrier platform 8, the main chain 5 and the respective auxiliary chains divide the load substantially equally between them; however, the number of automobiles carried by any one auxiliary chain is not very great so the construction need not be so heavy as the main chain.

The present invention lends itself to easy modification as shown, for example, in FIGS. 1, 5 and 6, and it also lends itself to modular construction wherein a larger facility may be made by placing a plurality of the units shown in FIG. 1, for example, adjacent each other and operating each as a unit.

Further modifications will occur to those skilled in the art and all such are considered to fall within the spirit and scope of the present invention as defined in the appended claims.

What is claimed is:

1. A conveyor elevator having, in combination, a pair of similar closed-loop main channels disposed in a pair of spaced substantially parallel planes, a further pair of similar closed-loop auxiliary channels disposed in a pair of substantially parallel planes one disposed adjacent to each of the main channels in the space there-between, a pair of synchronously driven main conveyors disposed to travel along the pair of main channels, follower means disposed to travel along the auxiliary channels, a carrier platform having a substantially horizontally disposed carrier surface disposed between the auxiliary channels, first attaching means connecting the carrier platform to the main conveyors, second attaching means at regions displaced from the first attaching means connecting the carrier platform to the follower means, and auxiliary conveyor means of effective length substantially less than the length of the main conveyors located adjacent to the said main conveyors only where the main conveyors and main channels change direction and for engaging and driving the follower means only at such locations, the main channels and the auxiliary channels at such locations being substantially parallel, whereby said carrier platform surface is maintained in substantially the same horizontal orientation throughout its travel.

2. A conveyor elevator as claimed in claim 1 and in which the main conveyors comprise roller chains.

3. A conveyor elevator as claimed in claim 1 and in which the carrier platform comprises a vertical member connected to the horizontally disposed carrier surface and the said first and second attaching means are respectively disposed at the upper and lower end of the vertical member.

4. A conveyor elevator as claimed in claim 1 and in which the main and auxiliary channels are formed in a plurality of U-shaped paths.

5. A conveyor elevator as claimed in claim 4 and in which the said U-shaped paths are substantially horizontally disposed.

6. A conveyor elevator as claimed in claim 1 and in which drive means is provided for the main conveyors and the auxiliary conveyors to effect movement of the carrier platforms in a path determined by the shape of the loops of the channels.

7. A parking garage for automobiles and the like comprising a building having entrance and exit means, and a conveyor elevator disposed to receive the automobiles at the entrance means, store the same and deliver the said automobiles to the exit means, the conveyor elevator having, in combination, a pair of similar closed-loop main channels disposed in a pair of spaced substantially parallel planes, a further pair of similar closed-loop auxiliary channels disposed in a pair of substantially parallel planes one adjacently displaced from each of the main channels in the space therebetween, a pair of synchronously driven main conveyors disposed to travel along the pair of main channels, follower means disposed to travel along the auxiliary channels, a plurality of successively disposed carrier platforms each having a substantially horizontally disposed carrier surface disposed between the auxiliary channels, first attaching means connecting each carrier platform to the main conveyors, second attaching means at regions displaced from the first attaching means connecting each carrier platform to the follower means, and auxiliary conveyor means of effective length substantially less than the length of the main conveyors located adjacent to the said main conveyors only where the main conveyors and main channels change direction and for engaging and driving the follower means only at such locations, the main channels and the auxiliary channels at such locations being substantially parallel, whereby the said carrier platform surface of each successive carrier platform is maintained in substantially the same horizontal orientation throughout travel.

8. A parking garage as claimed in claim 7 and in which opening means is provided in the auxiliary channels for enabling passage of the first attaching means therethrough.

9. A parking garage as claimed in claim 8 and in which the follower means comprises a plurality of multiple-roller followers and the auxiliary channels each have at their ends a divided raised track and a depressed track upon which the rollers of the followers may travel.

10. A parking garage as claimed in claim 7 and in which the entrance and exit means comprises a plurality of exits and entrances.

References Cited by the Examiner
UNITED STATES PATENTS

| | | |
|---|---|---|
| 1,841,529 | 1/32 | Geiger. |
| 2,069,886 | 2/37 | Joslin. |
| 2,089,047 | 8/37 | Zrna. |
| 3,034,666 | 5/62 | O'Neill _____ 214—16.12 |

HUGO O. SCHULZ, *Primary Examiner.*

GERALD M. FORLENZA, *Examiner.*